Feb. 22, 1927.

S. G. MAYERS 1,618,952

EDUCATIONAL BOARD

Filed Aug. 7, 1926 2 Sheets-Sheet 1

Inventor
S. G. Mayers.
By B. Pilchowiez
Atty.

Feb. 22, 1927.

S. G. MAYERS 1,618,952

EDUCATIONAL BOARD

Filed Aug. 7, 1926    2 Sheets-Sheet 2

Inventor
S. G. Mayers
By B. Pelechowie
atty.

Patented Feb. 22, 1927.

1,618,952

UNITED STATES PATENT OFFICE.

STANLEY G. MAYERS, OF CHICAGO, ILLINOIS.

EDUCATIONAL BOARD.

Application filed August 7, 1926. Serial No. 127,842.

The present invention relates to educational boards and its main object is the provision of an endless film provided with sets of characters or objects which may be selectively illuminated for demonstrating the same to the pupils.

Another object of the invention is the provision of a board of the character stated wherein the endless film is operated by suitable mechanism.

Another object of the invention is the provision of the device of the character indicated which is simple in construction and which is capable of easy and inexpensive manufacture.

With the above general objects in view and others that will appear as the nature of the invention is better understood, the same consists in the novel construction, combination and arrangement of parts hereinafter more fully described, illustrated in the accompanying drawings and pointed out in the appended claims.

In the drawings forming a part of this application and in which like designating characters refer to corresponding parts throughout the several views, Fig. 1 is the front elevational view of the board;

Figures 1, 2:
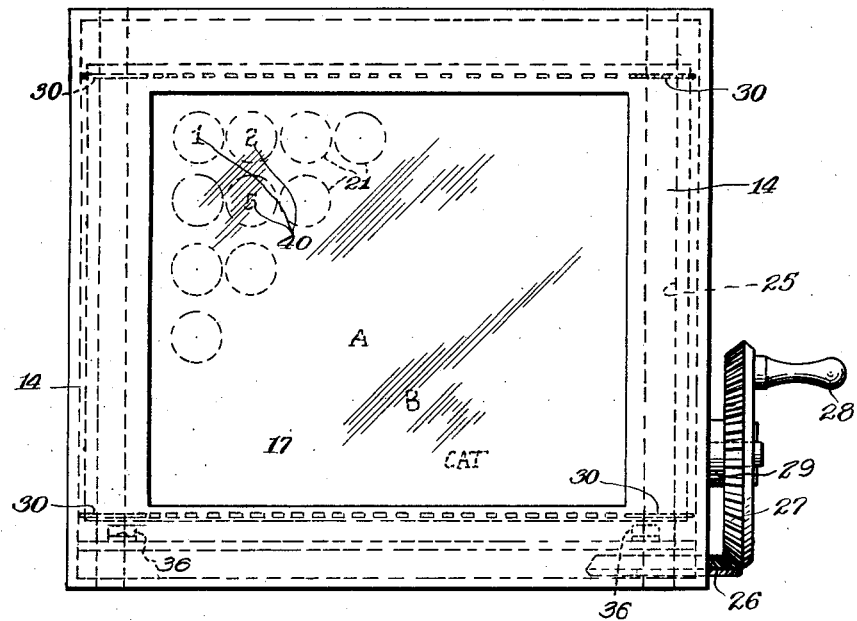
Fig. 2 is the side view of the invention, partly in elevation and partly in section.

The invention embodies a box comprising bottom 10, top 11 and sides 12 and 13. A rectangular frame 14 is provided at the front end of said box. Rearwardly of said frame are two ledges 15 and 16 attached in any suitable manner to the sides 12 and 13, respectively, and a similar ledge 16' is provided at the lower face of top 11, as indicated on Fig. 2. Said ledges are spaced from said frame 14 and accommodate in the resulting space the glass plate 17 permitting viewing of the figures and objects upon the film hereinafter described.

Above said bottom 10 baseboard 18 attached in any suitable manner to sides 12 and 13 is provided for supporting thereupon the remaining parts of the mechanism.

Rearwardly of said glass plate 17 rack 19 is provided for supporting a series of lamps 20 and cooperating reflectors 21, said rack 19 being attached to the baseboard 18 through the medium of laterally projecting ears 22 and screws 23. Rearwardly of the ledge 15 and sideways of reflectors 21 rotatable post 24 is positioned and is mounted within the bottom board 10 and top board 11. A similar post 25 is provided at the other side of the reflectors 21 and adjacent side 13 and is likewise mounted within bottom board 10 and top board 11. Said latter post 25 above the bottom board 10 and below the baseboard 18 is provided with a bevel gear 26 which meshes with bevel gear 27, which latter gear is adapted for manual rotation by means of handle 28, said gear 27 being set upon the bearing 29. Each of said posts 24 and 25 adjacent the upper end and the lower ends thereof are provided with sprocket wheels 30 for the purpose hereinafter described.

Figure 4:
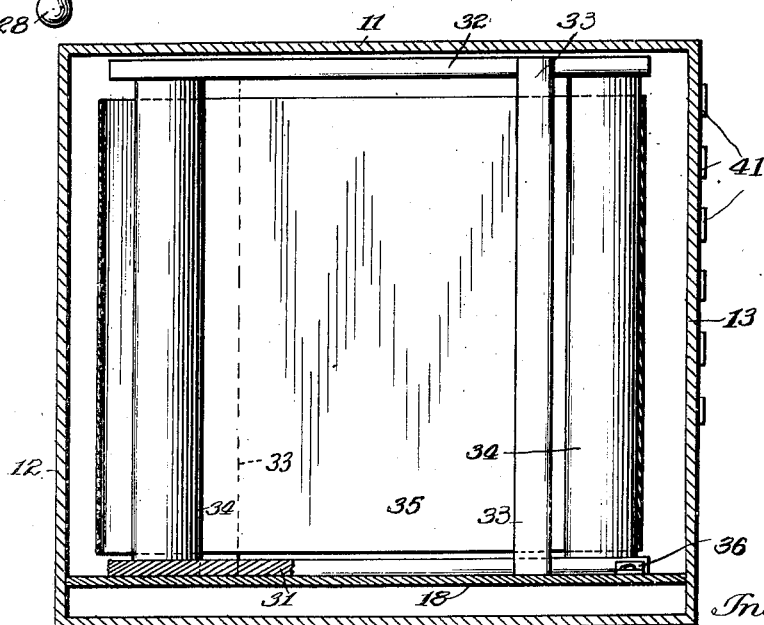
Fig. 4 is a cross-sectional view on line 4—4 of Fig. 3.

The invention further embodies film carriage best illustrated in Fig. 4, comprising bottom board 31, top board 32 and braces 33 connecting said boards together. Interposed between said two boards 31 and 32 is a plurality of rollers 34 upon which film 35 is adapted for movement. Two L-shaped plates 36 secured to the baseboard 18 prevent forward sliding movement of the film carriage.

Figure 3:
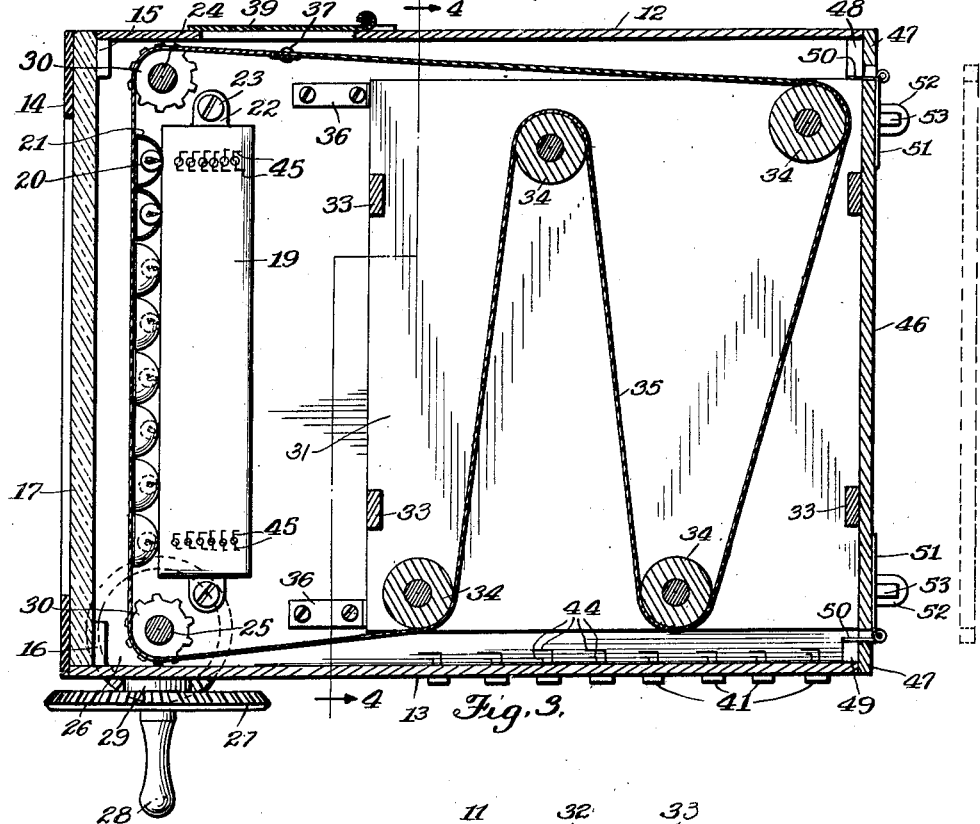
Fig. 3 is a cross-sectional view on horizontal plane.

The hereinabove mentioned film 35 of any translucent material is formed into a tape adapted for forming an endless belt by having its two ends joined together by any suitable means as by snap fasteners 37 or the like. Said film is further provided at its edges with series of openings 38 for receiving the teeth of sprocket wheels 30, as plainly seen on Figs. 2 and 3. Thus when the film is in operative position shown on Fig. 3 it will be adapted for sliding movement upon rollers 25 and 34 when under actuation by means of gears 26 and 27 and handle 28. For the purpose of disconnecting the film or connecting its two ends by fasteners 37 door 39 is provided at the side which affords access to the film.

Said film carries a series of numbers, words or illustration such as 40 properly spaced horizontally and vertically from each other so as to register with several lamps 20. It is observed that portion of film 35 when said film is in operative position remains in front of the reflectors 21 in back of the glass plate 17. Side 13 is provided with a number of switch plates 41 each having "on" and "off" buttons 42 and 43, respectively, for alternately lighting corresponding lamps 20 on rack 19 or extinguishing the same. Electric wires 44 two from each switch plate 41 connect with the rack 19 as at 45 and from there are connected to the lamps 20 for providing electrical circuit as is obvious.

To illuminate any given number, word or illustration 40, for the purpose of illustrating the same to the class, the "on" button 42 upon switch plate 41 which cooperates with a given lamp 20, is pressed and the given number, word or illustration 40 will become lit. Reversely on pressing button 43 the given lamp will become extinguished.

The rear end of the carriage has a wall 46 secured to the rear ends of bottom board 31, top board 32 and rear braces 33. When said carriage is in operative position shown on Fig. 3, said rear wall 46 remains flush with boards 47 which are rigidly secured to the rear ends of sides 12 and 13, and bottom 10 and top 11. Corner members 48 and 49 are positioned at the rear ends of sides 12 and 13, respectively. Said corner members 48 and 49 have shorter hinge leaves 50 fastened thereto, while the longer hinge leaves 51 of said hinges extend outwardly and are adapted to engage hasps 52 mounted upon wall 46. Wedges 53 provide means for maintaining said longer hinge leaves 51 in locked position, illustrated by full lines on Fig. 3. Thus it will be seen that said hinges keep the film carriage in operative position.

In order to change the film or to connect the electric wires 44, door 39 is opened, the two ends of the film disconnected, and thereupon the carriage may be removed from within the box on removing wedges 53 and opening the longer hinge leaves 51.

To assemble the several parts of the device upon withdrawing of said carriage from the outer box, the glass plate 17 is removed to provide access into the device, and the carriage is then shifted into the said box. When the carriage is within the box the end of the tape adjacent post 25 is manually pulled and passed forward between wall 13 and post 25 and its sprocket wheels 30, engaging the tape by said sprocket wheels. Then the tape is drawn across the rack 19 and lamps 20 and is passed between wall 12 and post 24 and engaged by sprockets 30 on post 24. Preparatory to the last mentioned engagement of the tape by the last stated sprocket wheels, the handle 28 is held manually, either by the same or another person, against rotation for preventing the rotation of post 25 and its sprocket wheels 30 in order that the portion of the tape between posts 24 and 25 may be drawn tight upon the two sets of sprocket wheels 30.

When the above operation has been completed the end of the tape last mentioned is manually held through the opening at the door 39 from slipping, while the other end of the tape is manipulated either manually or by any suitable instrument for drawing the same toward the first mentioned end of the tape and when the two ends are brought together the same are joined by clasps 37 as hereinabove stated. Thereupon glass plate 17 is reinserted into the front of the box as shown on Fig. 3.

It is further observed that in order to ascertain how far the tape has been brought around by means of crank wheel 27 one of the lamps 20 should be lit and the position of one of the several representations 40 in respect of said lit lamp will indicate the respective position of the visible area of the tape in respect of all the lamps.

While there is described herein a preferred embodiment of the present invention, it is nevertheless to be understood that minor changes may be made therein without departing from the spirit and scope of the invention as claimed.

What I claim as new is:

1. An educational board comprising a box, a set of rollers therewithin, a carriage receivable within said box, a set of rollers in said carriage, and a tape associated with the two sets of rollers.

2. An educational board comprising a box, a set of rollers therewithin, a carriage receivable within said box, a set of rollers in said carriage, and means associated with one roller of the first set for imparting rotary movement thereto for the purpose of shifting said tape.

3. An educational board comprising a box, a set of rollers therewithin, a carriage receivable within said box, a set of rollers within said carriage, and endless tape upon the two sets of said rollers, means for rotating one roller of the first set for the purpose of imparting shifting movement of said tape, and means permitting the tape to be disengaged from the two sets of rollers.

4. An educational board comprising a box, a set of rollers in said box, sprocket wheels upon said rollers, a carriage receivable within said box, a set of rollers in said carriage, an endless tape upon the two sets of said rollers, said tape being provided with perforations for engaging said tape with said sprocket wheels, means for rotating said sprocket wheels for the purpose of shifting said tape upon the rollers, and means for removing the tape from the rollers.

5. An educational board comprising a box, a set of rollers within said box, a carriage receivable within said box, a set of rollers within said carriage, a series of lamps arranged in rectangular formation and positioned adjacent to the first set of rollers, an endless tape spread upon said rollers, a plurality of representations upon said tape, said representations being adapted to register with the several lamps, and means for selectively lighting the said lamps.

6. An educational board comprising a box, a set of rollers within said box, a carriage receivable within said box, a set of rollers within said carriage, a series of lamps arranged in rectangular formation and positioned adjacent to the first set of rollers, an endless tape spread upon said rollers, a plurality of representations upon said tape, said representations being adapted to register with the several lamps, and means for shifting said tape upon said rollers.

In testimony whereof I affix my signature.

STANLEY G. MAYERS.